United States Patent
Okuyama et al.

(10) Patent No.: US 10,637,542 B2
(45) Date of Patent: Apr. 28, 2020

(54) BASE STATION AND METHOD FOR PERFORMING BEAMFORMING IN AN MU-MIMO ENVIRONMENT

(71) Applicant: NTT DOCOMO, INC., Tokyo (JP)

(72) Inventors: Tatsuki Okuyama, Tokyo (JP); Satoshi Suyama, Tokyo (JP); Tatsunori Obara, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/769,614

(22) PCT Filed: Feb. 21, 2017

(86) PCT No.: PCT/JP2017/006294
§ 371 (c)(1),
(2) Date: Apr. 19, 2018

(87) PCT Pub. No.: WO2017/154555
PCT Pub. Date: Sep. 14, 2017

(65) Prior Publication Data
US 2018/0316397 A1 Nov. 1, 2018

(30) Foreign Application Priority Data
Mar. 11, 2016 (JP) ................. 2016-048755

(51) Int. Cl.
*H04B 7/0452* (2017.01)
*H04B 7/06* (2006.01)
*H04W 16/28* (2009.01)

(52) U.S. Cl.
CPC ......... *H04B 7/0452* (2013.01); *H04B 7/0608* (2013.01); *H04B 7/0626* (2013.01); *H04W 16/28* (2013.01); *H04B 7/065* (2013.01)

(58) Field of Classification Search
CPC .. H04B 7/0452; H04B 7/0608; H04B 7/0626; H04J 1/00; H04W 16/28
See application file for complete search history.

(56) References Cited

U.S. PATENT DOCUMENTS 9,634,750 B2 * 4/2017 Kwak ................. H04B 7/0617
2010/0273499 A1 * 10/2010 van Rensburg ... H04W 72/1231
455/450

(Continued)

FOREIGN PATENT DOCUMENTS

| EP | 3166232 A1 | 5/2017 |
| JP | 2015-528680 A | 9/2015 |
| WO | 2016/000556 A1 | 1/2016 |

OTHER PUBLICATIONS

International Search Report issued in PCT/JP2017/006294 dated May 16, 2017 (5 pages).

(Continued)

*Primary Examiner* — Ian N Moore
*Assistant Examiner* — Rushil Parimal Sampat
(74) *Attorney, Agent, or Firm* — Osha Liang LLP

(57) ABSTRACT

Provided is a base station for communicating with mobile stations of a radio communication system including the base station and mobile stations including an obtaining unit that obtains a channel matrix for each mobile stations; a selector that selects, among the mobile stations, a combination of two or more mobile stations with which communication based on multi-user MIMO is to be performed; and a communication unit that communicates, based on multi-user MIMO, with the two or more mobile stations of the selected combination, wherein the selector calculates, for each of all combinations of two mobile stations of the two or more mobile stations, a correlation value between the channel matrices for the two mobile stations, and selects the combination of the two or more mobile stations, so that, for all (Continued)

the combinations of the two mobile stations, the correlation values is less than or equal to a predetermined value.

6 Claims, 12 Drawing Sheets

(56) References Cited

U.S. PATENT DOCUMENTS

2015/0124688 A1* 5/2015 Xu .................. H04B 7/0452
370/312
2015/0236767 A1   8/2015 Maruta et al.

OTHER PUBLICATIONS

Written Opinion issued in PCT/JP2017/006294 dated May 16, 2017 (4 pages).
NTT DOCOMO, INC.; "5G Radio Access: Requirements, Concept and Technologies"; DOCOMO 5G White Paper, Sep. 2014 (27 pages).
Arai, T. et al.; "Multi-planar Parallelogram Array Antennas and Simplified User Scheduling for Massive Antenna Systems for Wireless Entrance (MAS-WE)", with English Abstract; IEICE Technical Report, vol. 114, No. 86, Jun. 10, 2014; pp. 269-274 (6 pages).
Office Action issued in counterpart Japanese Patent Application No. 2016-048755, dated Jun. 11, 2019 (5 pages).
Office Action issued in counterpart European Patent Application No. 17762898.9, dated Aug. 19, 2019 (15 pages).
Extended European Search Report issued in counterpart European Patent Application No. 17762898.9, dated Dec. 6, 2019 (12 pages).

\* cited by examiner

BASE STATION OF RELATED ART

Massive MIMO BASE STATION

FIG.7

| COMBINATIONS OF MOBILE STATIONS | CORRELATION VALUES |
|---|---|
| 1,2 | 0.8 |
| 1,3 | 0.5 |
| 1,4 | 0.6 |
| 2,3 | 0.4 |
| 2,4 | 0.9 |
| 3,4 | 0.3 |

FIG.9

| COMBINATION CANDIDATES (K) OF MOBILE STATIONS ||
|---|---|
| 2 USERS | (1,2), (1,3), (1,4), (2,3), (2,4), (3,4) |
| 3 USERS | (1,2,3), (1,2,4), (1,3,4), (2,3,4) |
| 4 USERS | (1,2,3,4) |

BASE STATION AND METHOD FOR PERFORMING BEAMFORMING IN AN MU-MIMO ENVIRONMENT

TECHNICAL FIELD

The present invention relates to a base station.

BACKGROUND ART

In Long Term Evolution (LTE), in order to achieve a further increase in a system capacity, a further increase in a data transmission rate, and further reduction of latency in a radio section, a study of a radio communication scheme called 5G has been progressed. In 5G, various element techniques have been studied in order to satisfy requirements that latency in a radio section be less than or equal to 1 ms while achieving throughput of greater than or equal to 10 Gbps.

In 5G, a higher frequency band than that of LTE is assumed to be used. Here, since a propagation loss increases in a high frequency band, the application of massive Multi Input Multi Output (MIMO) in which beam forming with a narrow beam width is performed has been studied to compensate for it. Massive MIMO is a large-scale MIMO in which a plurality of antenna elements (for example, 100 elements) is installed at a base station side, and it is possible to reduce interference between mobile stations since it is possible to concentrate an electric field strength in a narrow region.

FIG. 1A illustrates an example of beam forming performed by a base station according to a related art such as LTE, and FIG. 1B illustrates an example of beam forming performed by a base station using massive MIMO. As illustrated in FIG. 1B, it is possible to transmit radio signals far away through beam forming with a narrow beam width.

FIG. 2A illustrates an operation example when a base station of related art performs multi-user MIMO (MU-MIMO), and FIG. 2B illustrates an operation example when a base station using massive MIMO performs MU-MIMO. As illustrated in FIG. 2B, since the base station using massive MIMO has a sufficient degree of freedom of an antenna, it is possible to control interference highly by directing a thin beam to a desired mobile station and directing null (a direction in which a signal is not transmitted) to the other mobile station.

CITATION LIST

Non-Patent Document

Non-Patent Document 1: NTT DoCoMo, Inc. "Docomo 5G White Paper," September 2014

SUMMARY OF THE INVENTION

Problem to be Solved by the Invention

In massive MIMO, when MU-MIMO is performed, the base station selects a combination of mobile stations among a plurality of mobile stations located in an area so that a high communication quality (for example, a high throughput or a capacity in which a plurality of mobile stations can be accommodated) can be secured in the entire radio communication system. As a method of selecting a combination of mobile stations by the base station, for example, a method is considered that is for selecting an optimum combination of mobile stations by performing a predetermined calculation based on a channel matrix (H) between the base station and the mobile station.

If it is not considered to cause radio signals to be orthogonal among mobile station (that is, if a null direction is not considered), it is considered that the base station simply selects a plurality of mobile stations capable of achieving a high communication quality as a mobile station alone based on a channel matrix (H) of each mobile station. However, since there is a possibility that interference may occur between the mobile stations, the communication quality as the entire system may be deteriorated. Accordingly, it is desirable that the base station select a combination of mobile stations capable of achieving a high communication quality while causing radio signals to be orthogonal among mobile stations.

When a combination of mobile stations capable of achieving high communication quality is selected while causing radio signals to be orthogonal among mobile stations, it can be considered that the base station selects a combination of mobile stations capable of achieving a high communication quality by calculating an orthogonalization weight (W) by which each transmitting antenna of the base station is multiplied using the channel matrix (H) between the base station and each mobile station and performing a predetermined calculation based on an equivalent channel (H×W) obtained by multiplying the channel matrix (H) by the orthogonalization weight (W).

However, since the orthogonalization weight (W) varies according to mobile stations to be combined, it is necessary for the base station to calculate the orthogonalization weight (W) for each combination using the channel matrix (H) of all the mobile stations to be combined. For example, when an optimum combination of two mobile stations is obtained from six mobile stations, it is necessary to calculate the orthogonalization weight (W) for each mobile station for each of 15 combinations. Specifically, the base station calculates the orthogonalization weight (W) of each of a mobile station A and a mobile station B when the mobile station A and the mobile station B among six mobile stations are combined, calculates the orthogonalization weight (W) of each of the mobile station A and a mobile station C when the mobile station A and the mobile station C are combined, and calculates the orthogonalization weight (W) of each of the mobile station A and a mobile station D when the mobile station A and the mobile station D are combined, that is, it is necessary for the base station to calculate the orthogonalization weight (W) for all combinations and for each mobile station. Furthermore, in order to obtain an optimum combination from six mobile stations, it is necessary to calculate the orthogonalization weight (W) for each mobile station similarly when three mobile stations among six mobile stations are combined, when four mobile stations are combined, when five mobile stations are combined, or when all mobile stations are combined, and thus a calculation amount becomes more enormous.

Further, in order to take account of a variation in the channel matrix (H) which is caused because frequencies are different, it is desirable to perform a calculation of the orthogonalization weight (W) and the equivalent channel (H×W) in the entire band (for example, for all subcarriers of the entire band), but a calculation amount is further increased. Since the massive MIMO base station includes a large number of antenna elements, the size of the channel matrix (H) is large, and the calculation amount necessary for calculating the orthogonalization weight (W) and the equivalent channel (H×W) is further increased.

As described above, since the base station using massive MIMO should perform an enormous calculation when a combination of mobile stations is selected, it takes a great amount of time to determine a combination of mobile stations. Further, it is unable to start data communication until a combination of mobile stations is determined, and communication efficiency of the entire system is reduced.

The disclosed technique has been developed in light of the foregoing, and it is an object of the present invention to provide a technique capable of promptly selecting a combination of mobile stations that perform MU-MIMO in a radio communication system using MU-MIMO.

Means for Solving Problem

A base station according to disclosed technology is a base station for communicating with a plurality of mobile stations of a radio communication system including the base station and the plurality of mobile stations, the base station including an obtaining unit that obtains a channel matrix for each of the plurality of mobile stations; a selector that selects, among the plurality of mobile stations, a combination of two or more mobile stations with which communication based on multi-user MIMO is to be performed; and a communication unit that performs the communication based on multi-user MIMO with the two or more mobile stations of the selected combination, wherein the selector calculates, for each of all combinations of two mobile stations of the two or more mobile stations, a correlation value between the channel matrices for the two mobile stations, and selects the combination of the two or more mobile stations, so that, for all the combinations of the two mobile stations, the correlation values is less than or equal to a predetermined value.

Effect of the Invention

According to the disclosed technology, a technique is provided that allows a combination of mobile stations performing MU-MIMO to be quickly selected in a radio communication system using MU-MIMO.

BRIEF DESCRIPTION OF DRAWINGS

FIG. 7 is a diagram illustrating examples of combinations of mobile stations and correlation values;

FIG. 9 is a diagram illustrating an example of candidates of a combination of mobile stations;

MODE(S) FOR CARRYING OUT THE INVENTION

In the following, an exemplary embodiment of the present invention is described with reference to the appended drawings. An embodiment to be described below is merely an example, and an embodiment to which the present invention is applied is not limited to the following embodiment. For example, a radio communication system according to the present embodiment is assumed to be a system of a scheme conforming to LTE or 5G; however, the present invention is not limited to LTE or 5G, and can be applied to other schemes.

<System Configuration>

Figure 1A:
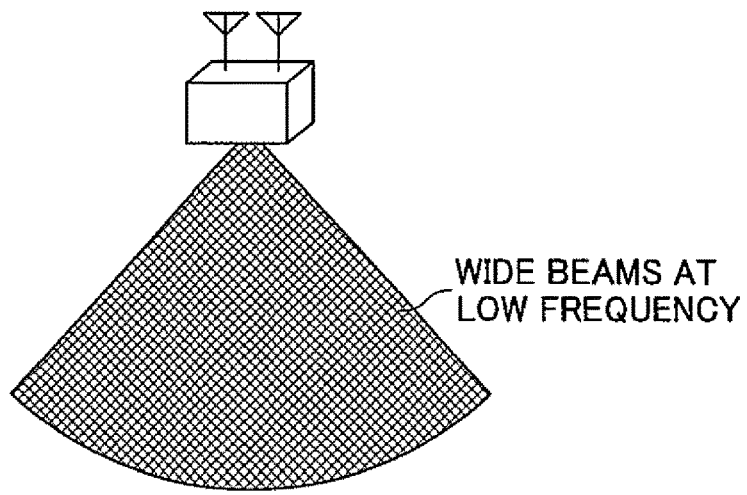
FIG. 1A is a diagram illustrating an example of beam forming.
Figure 1B:
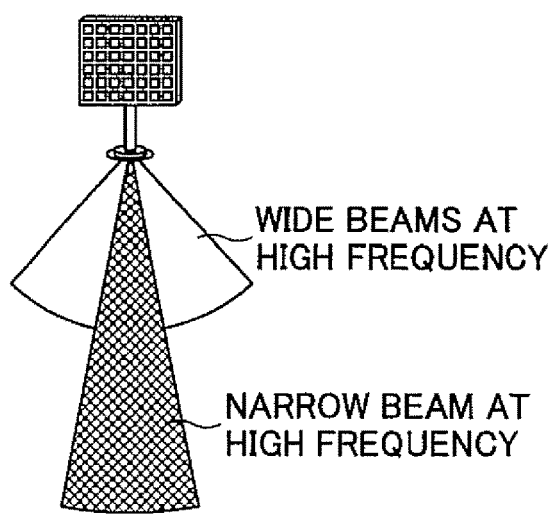
FIG. 1B is a diagram illustrating an example of the beam forming.
Figure 2A:
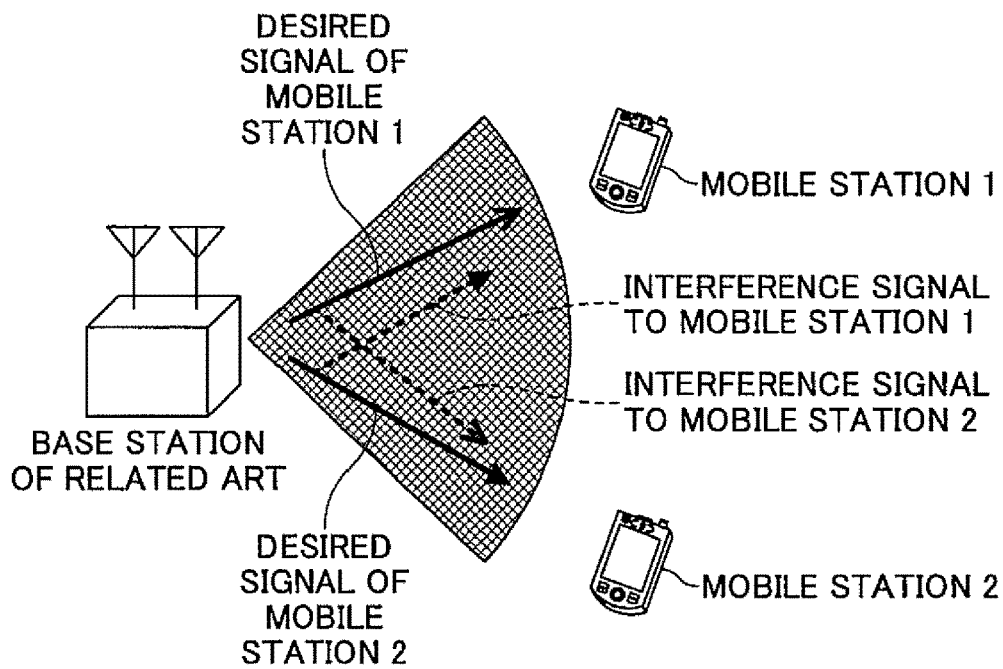
FIG. 2A is a diagram illustrating an example of MU-MIMO.
Figure 2B:
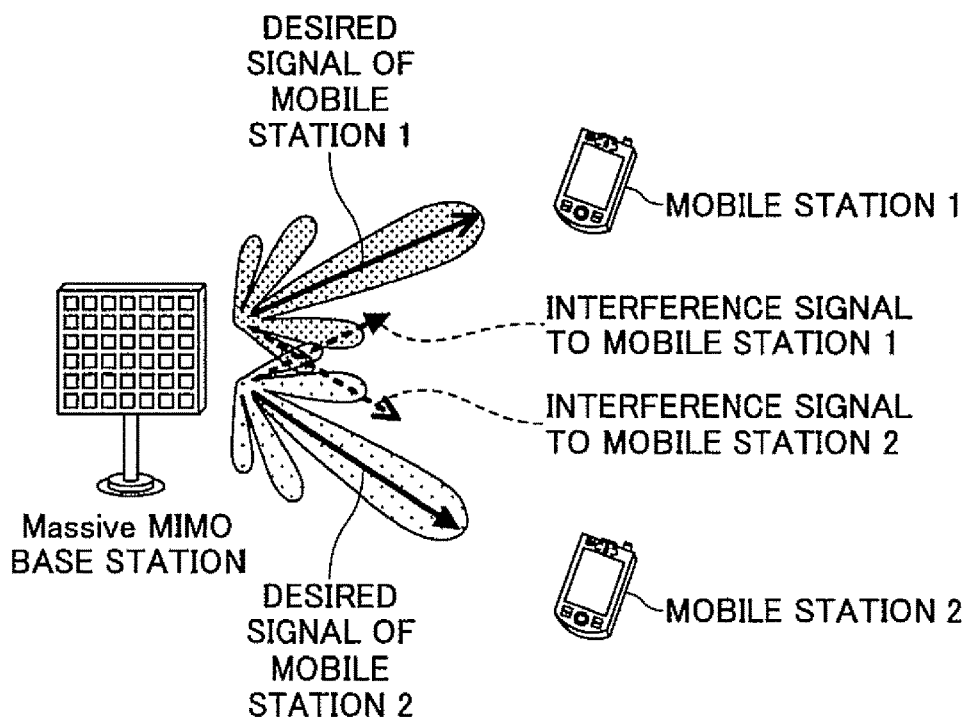
FIG. 2B is a diagram illustrating an example of MU-MIMO
Figure 3:
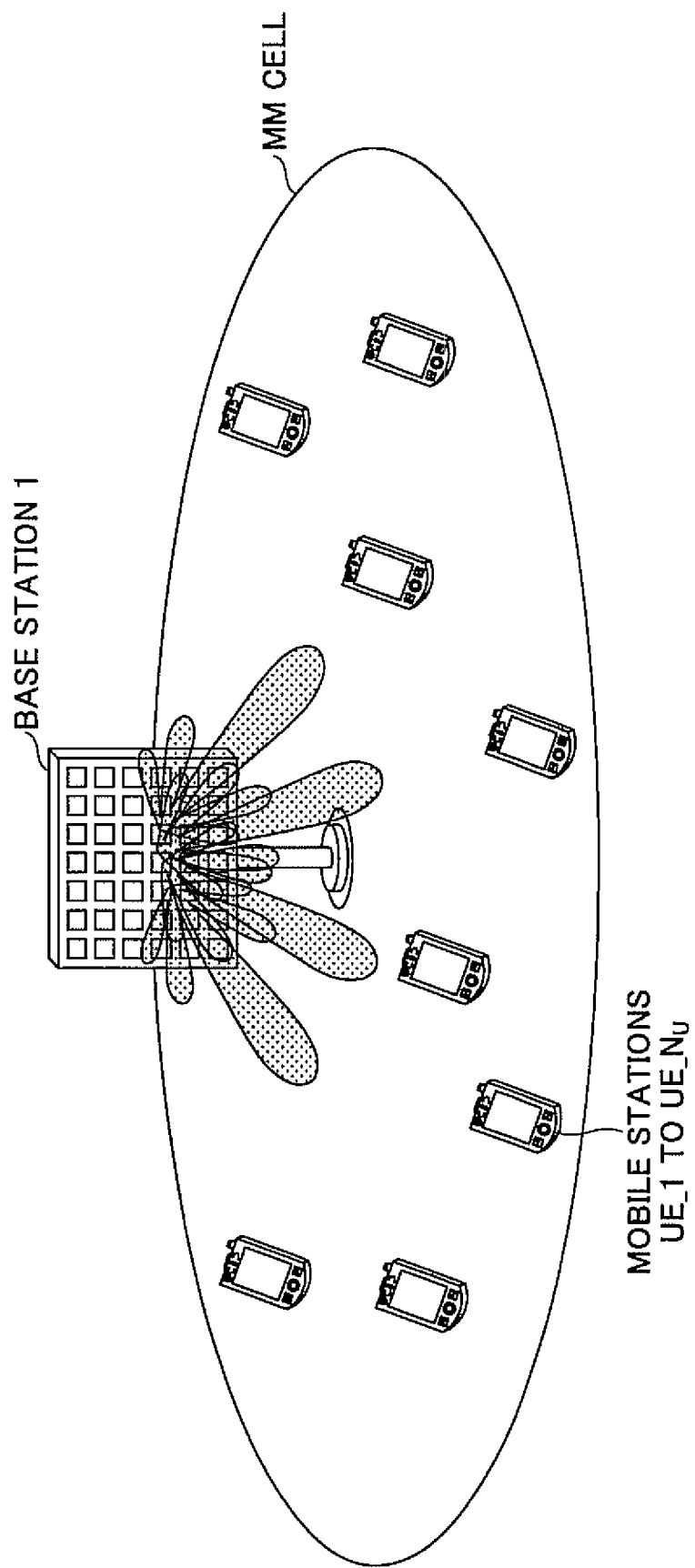
FIG. 3 is a diagram illustrating an exemplary configuration of a radio communication system according to an embodiment.

FIG. 3 is a diagram illustrating an exemplary configuration of a radio communication system according to an embodiment. The radio communication system according to the embodiment includes a base station 1 that supports massive MIMO and "$N_U$" mobile station UE, that is, mobile stations UE1 to UEN$_U$. In the following description, when it is unnecessary to distinguish the mobile stations UE1 to UEN$_U$, they are simply referred to as a "mobile station UE." Further, a specific mobile station UE among "$N_U$" mobile stations UE is indicated by a "mobile station UE(i)," a "mobile station UE(j)," or the like. Note that i, j=1 to $N_U$.

The base station 1 includes a large number of antenna elements and forms a massive MIMO cell (an MM cell). The MM cell is intended to be a cell formed by a plurality of beams transmitted from the base station 1. In the MM cell, for example, using a band with a bandwidth of 100 MHz or higher at 5 GHz or higher, it is possible to implement higher speed communication than in the macro cell.

The mobile station UE includes a plurality of antenna elements and has a function of communicating with the base station 1 according to MIMO.

<Operation Overview>

In the present embodiment, the base station 1 selects an appropriate combination of mobile stations UE from "$N_U$" mobile station UEs located in the MM cell, and performs MU-MIMO communication.

Figure 4:
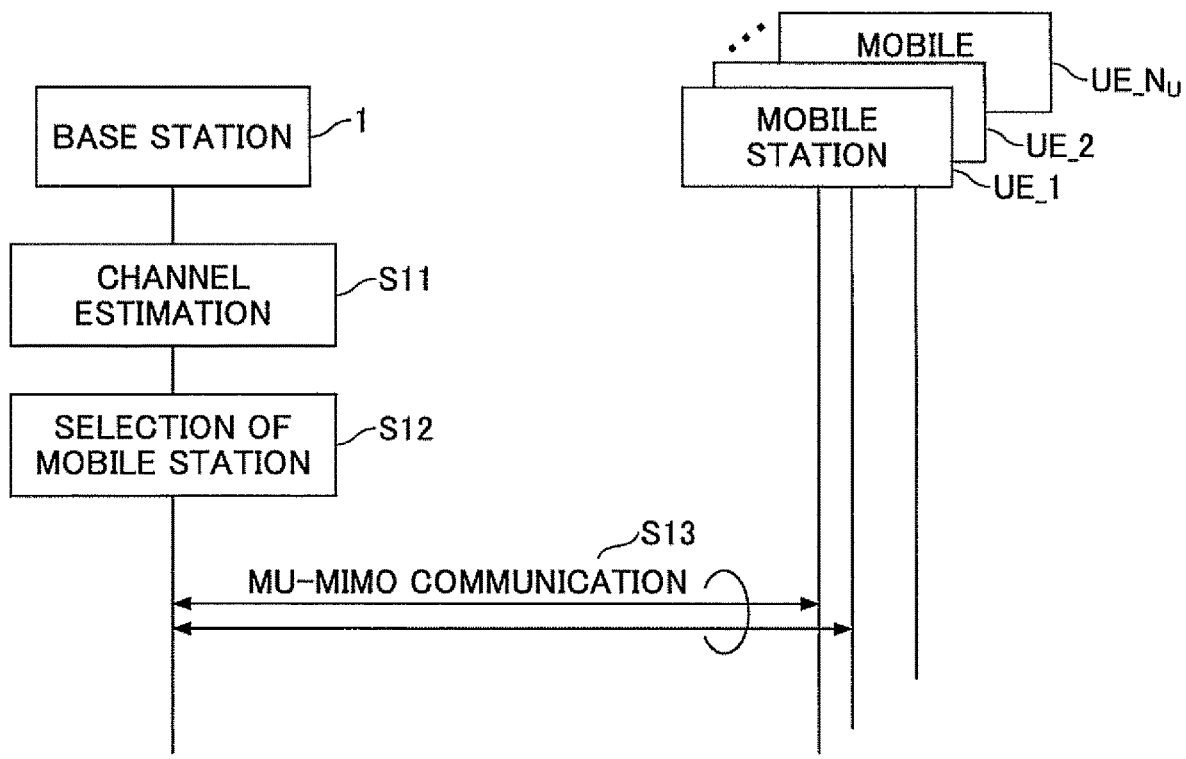
FIG. 4 is a sequence diagram illustrating an overview of an operation performed in a radio communication system according to an embodiment.

FIG. 4 is a sequence diagram illustrating an overview of an operation performed in the radio communication system according to the embodiment. First, the base station 1 obtains downlink channel matrices (H 1 to H$_{NU}$) between the antennas between the base station 1 and the mobile stations UE1 to UEN$_U$ (S11). Then, the base station 1 calculates a correlation value or an equivalent channel through "<processing procedure>" to be described below using the obtained channel matrices (H 1 to H$_{NU}$), and selects a combination of mobile station UEs capable of achieving a high communication quality (S12). Then, the base station 1 starts MU-MIMO communication according to the selected combination of mobile stations UE (S13).

<Functional Configuration>

Figure 5:
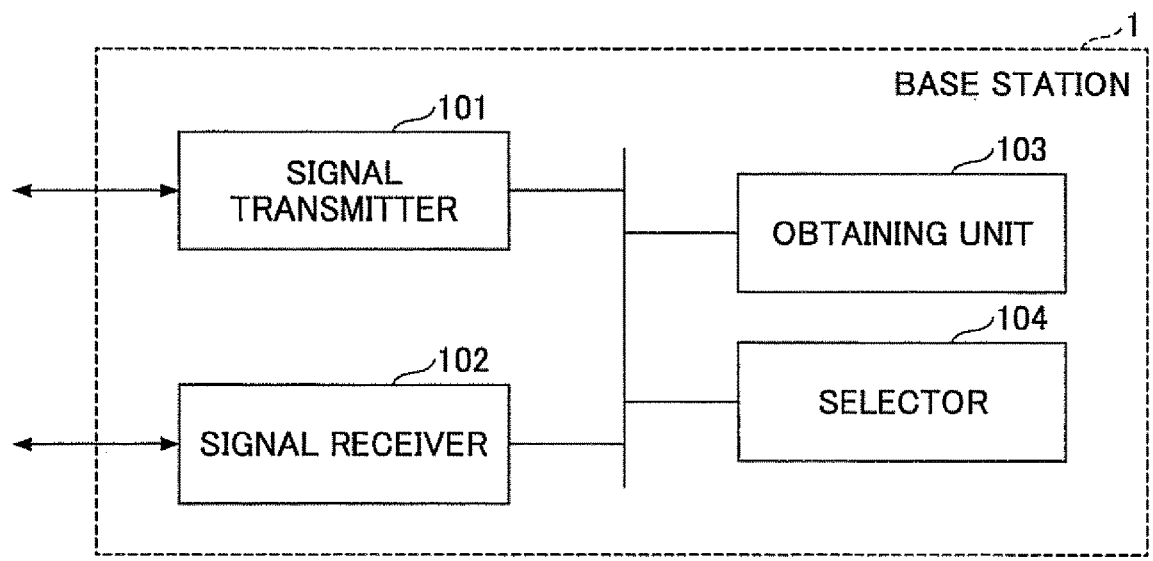
FIG. 5 is a diagram illustrating an exemplary functional configuration of a base station according to an embodiment.

FIG. 5 is a diagram illustrating an exemplary functional configuration of the base station according to an embodiment. As illustrated in FIG. 5, the base station 1 includes a signal transmitter 101, a signal receiver 102, an obtaining unit 103, and a selector 104. FIG. 5 illustrates only main functional units in the present embodiment, and functions (not illustrated) of performing operations conforming to a communication scheme used in the present radio communication system are also provided. However, some of processes of the base station 1 (for example, a specific one or more processing procedures, a specific example, a modified example, or the like) described in "<processing procedure>" to be described later may be able to be performed.

The signal transmitter 101 has a function of generating various kinds of signals of a physical layer from signals of a higher layer and wirelessly transmitting the signals. Further, the signal transmitter 101 has a function of performing MU-MIMO communication with a plurality of mobile station UEs selected by the selector 104. The signal receiver 102 has a function of obtaining a signal of a higher layer from a signal of the physical layer received from the mobile station UE.

The obtaining unit 103 has a function of acquiring a downlink channel matrix (H 1 to HNU) between antennas between the base station 1 and the mobile stations UE1 to $UEN_U$. The obtaining unit 103 performs channel estimation based on uplink reference signals transmitted from antennas of the mobile stations UE1 to $UEN_U$ using uses reciprocity of time division duplex (TDD), and obtains the channel matrices (H 1 to $H_{NU}$). Further, the obtaining unit 103 may obtain the channel matrices (H 1 to $H_{NU}$) (fed back) from the mobile stations UE1 to $UEN_U$.

The selector 104 has a function of selecting a combination of a plurality of mobile stations UE that perform MU-MIMO communication among the mobile stations UE1 to $UEN_U$. More specifically, based on the channel matrices (H 1 to $H_{NU}$) obtained by the obtaining unit 103, the selector 104 selects a combination of a plurality of mobile stations UE that perform MU-MIMO communication.

<Hardware Configuration>

Figure 6:
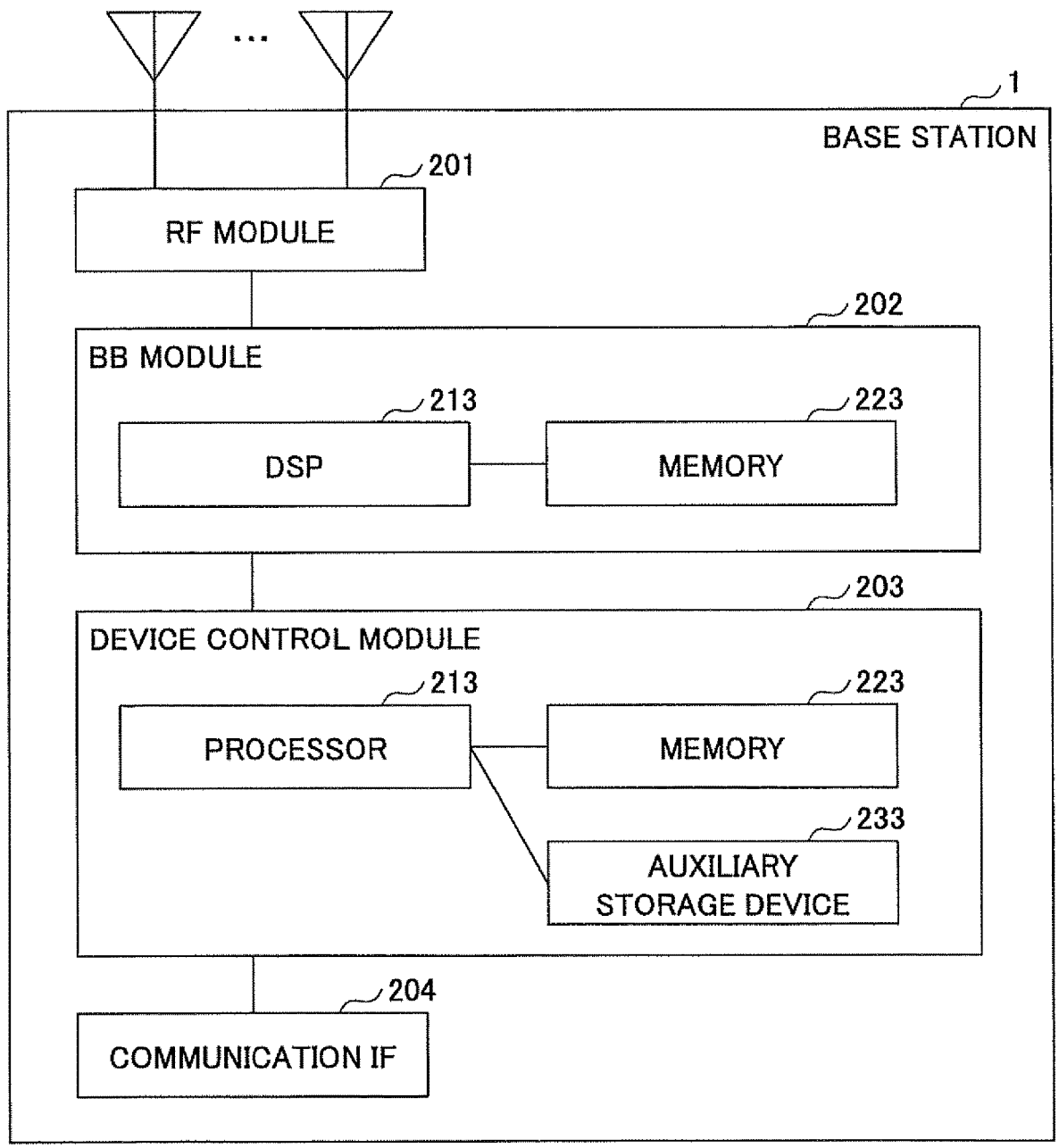
FIG. 6 is a diagram illustrating an exemplary hardware configuration of a base station according to an embodiment.

FIG. 6 is a view illustrating an exemplary hardware configuration of the base station according to the embodiment. FIG. 6 illustrates a configuration that is closer to an implementation example than that of FIG. 5. As illustrated in FIG. 6, the base station 1 includes an radio frequency (RF) module 201 that performs processing related to a radio signal, a baseband (BB) processing module 202 that performs baseband signal processing, a device control module 203 that performs processing of the higher layer and the like, and a communication IF 204 that perform communication with other base stations or the like.

The RF module 201 performs digital-to-analog (D/A) conversion, modulation, frequency transform, power amplification, and the like on a digital baseband signal received from the BB processing module 202 and generates a radio signal to be transmitted through an antenna. Further, the RF module 301 performs frequency transform, analog to digital (A/D) conversion, demodulation, and the like on a received radio signal, generates a digital baseband signal, and transfers the digital baseband signal to the BB processing module 202. The RF module 201 includes, for example, a part of the signal transmitter 101 and a part of the signal receiver 102 illustrated in FIG. 5.

The BB processing module 202 performs a process of converting an IP packet into a digital baseband signal and vice versa. A digital signal processor (DSP) 212 is a processor that performs signal processing in the BB processing module 202. A memory 222 is used as a work area of the DSP 212. The BB processing module 202 includes, for example, a part of the signal transmitter 101, a part of the signal receiver 102, the obtaining unit 103, and the selector 104 illustrated in FIG. 5.

The device control module 203 performs protocol processing of the IP layer and the like. A processor 213 is a processor that performs processing performed by the device control module 203. A memory 223 is used as a work area of the processor 213. For example, the device control module 203 may include the obtaining unit 103 and the selector 104 illustrated in FIG. 5.

<Processing Procedure>

Next, a processing procedure is described, which is for the selector 104 of the base station 1 to select a combination of mobile stations DE that perform MU-MIMO communication among "$N_U$" mobile station UEs located in the MM cell based on the channel matrices (H 1 to $H_{NU}$) obtained by the obtaining unit 103.

(Processing Procedure (Part 1))

In a processing procedure (part 1), the selector 104 calculates a correlation value of channel matrices ($H_i$ and $H_j$) of two mobile stations (here, i and j) from the channel matrices (H 1 to $H_{NU}$) with each of a plurality of mobile stations UE1 to $UEN_N$, and selects a combination of a plurality of mobile stations UE so that the correlation value is a predetermined threshold value or less in all combinations of two mobile stations.

First, the selector 104 calculates a correlation value ($C_{i,j}$) of the channel matrices ($H_i$ and $H_j$) using Formula (1) and Formula (2). In Formula (1), "$h_i$" indicates a column vector obtained by cutting out a longitudinal component of the channel matrix "$H_i$." Formula (1) indicates an example of the channel matrix ($H_i$), but it is possible to indicate the channel matrix ($H_j$) and the column vector "$h_j$" by a similar formula by replacing "i" in Formula (1) with "j."

[Math. 1]

$$H_i = \begin{bmatrix} h_i(1,1) & \wedge & h_i(1, N_T) \\ M & O & M \\ h_i(N_{Ri}, 1) & \wedge & h_i(N_{Ri}, N_T) \end{bmatrix} \quad \text{formula (1)}$$
$$= [h_{i,1} \quad \wedge \quad h_{i,N_T}]$$

$N_{Ri}$: Number of antennas of i-th user
$N_T$: Number of antennas of base station

[Math. 2]

$$c_{i,j} = \sum_{n_t \in \mu} \|h_{i,n_t}^H h_{j,n_t}\|^2 / (a_{i,n_t} \cdot a_{j,n_t}) \quad \text{formula (2)}$$

$n_t$: Antenna selected for correlation calculation
$\mu$: Number of antennas selected for correlation calculation (maximum $N_t$)
$a_{i,n_t}, a_{j,n_t}$: Normalization coefficient In Formula (2), the selector 104 may calculate the correlation value using the column vectors "$h_i$" and "$h_j$" of all antennas (1 to $N_T$) of the base station 1 as the antenna "$n_t$"

used for correlation calculation or may calculate the correlation value using only the column vectors "$h_i$" and "$h_j$" of some antennas. In the case of using only some antennas, the selector 104 may select the antennas "$n_t$" at equal intervals (for example, the antennas 1, 5, 9, and the like) from all the antennas (1 to $N_T$) of the base station 1 or may select antennas in an optional range (for example, only a range of the antennas 5 to 12 or the like). The selector 104 can reduce the calculation amount to be smaller than when the correlation is calculated using the column vectors "$h_i$" and "$h_j$" of all the antennas of the base station 1.

Normalization coefficients ($\alpha_{i,nt}$) and ($\alpha_{j,nt}$) of Formula (2) can be calculated by taking an autocorrelation of column vectors "$h_{i,nt}$" and "$h_{j,nt}$." The selector 104 may calculate the normalization coefficients ($\alpha_{i,nt}$) and ($\alpha_{i,nt}$) each time the correlation value is calculated or may reduce the calculation time and the calculation amount by retaining a calculation result in a memory, a table, or the like and reusing the calculation result.

The selector 104 selects the mobile station UE as a plurality of mobile stations UE that perform MU-MIMO communication so that the correlation value is a predetermined threshold value or less in all combinations of two mobile stations UE among a plurality of mobile stations UE. Here, a specific example in which the selector 104 selects two or more mobile stations UE that perform MU-MIMO communication from four mobile stations UE (1 to 4) is described. A predetermined threshold value is assumed to be set to 0.7 in advance. FIG. 7 illustrates an example of correlation values for combinations of two mobile stations UE among four mobile stations UE.

Referring to FIG. 7, a correlation value of a combination of mobile stations UE is 0.7 or less when two of a mobile station UE1, a mobile station UE3 and a mobile station UE4 are combined. More specifically, the correlation value of the combination of the mobile stations UE1 and UE3 is 0.5, the correlation value of the combination of the mobile stations UE1 and UE4 is 0.6, and the correlation value of the combination of the mobile stations UE3 and UE4 is 0.3. In other words, when two of the mobile station UE1, the mobile station UE3, and the mobile station UE4 are combined, the correlation value is 0.7 or less in all combinations of mobile stations UE. Accordingly, the selector 104 selects the mobile station UE1, the mobile station UE3, and the mobile station UE4 as a plurality of mobile stations UE that perform MU-MIMO communication.

Note that, for selecting the mobile stations UE so that the correlation value is less than or equal to a predetermined threshold value, if there are a plurality of candidates, the selector 104 may select any one of the candidates, for example, using any one of [Selection method 1] to [Selection method 3], which are described below. For example, according to the example of FIG. 7, the combinations of mobile stations UE in which the correlation value is 0.7 or less are the combinations of two of the mobile stations UE1, UE3, and UE4 and the combination of the mobile stations UE3 and UE4.

[Selection Method 1]

The selector 104 may select a candidate having a small number of mobile stations UE (or a candidate having a large number of mobile stations UE) among a plurality of candidates or may select one of a plurality of candidates based on a desired quality of the mobile station UE (for example, a desired throughput). For example, when there is a mobile station UE that does not desire a high throughput (for example, when the mobile station UE is a machine type communication (MTC) terminal), the selector 104 may select a candidate in which the mobile station UE is not included.

[Selection Method 2]

The selector 104 may select a candidate in which the number of mobile station UEs to be selected is a threshold value which is set in advance or less. For example, when "2" is set as the number of mobile station UEs to be selected in advance, the selector 104 may select candidates of the mobile station UE3 and the mobile station UE4.

[Selection Method 3]

Further, the selector 104 may calculate an equivalent channel (H×W) for each of a plurality of candidates for each mobile station UE or may select a candidate determined to be high in a communication quality based on an eigenvalue obtained by singular value decomposition of the equivalent channel. For example, the selector 104 may select a candidate determined to be high in a communication quality by comparing an eigenvalue of each of equivalent channels ($H_1 \times W_1$, $H_3 \times W_3$, and $H_4 \times W_4$) obtained by multiplying channel matrices ($H_1$, $H_3$, and $H_4$) by orthogonalization weights ($W_1$, $W_3$, and $W_4$) when the mobile stations UE1, UE3, and UE4 are combined with an eigenvalue of each of the equivalent channels ($H_3 \times W_3$ and $H_4 \times W_4$) obtained by multiplying the channel matrices ($H_3$ and $H_4$) by the orthogonalization weights ($W_3$ and $W_4$) when the mobile stations UE3 and UE4 are combined. Any method can be used as a method of selecting a candidate determined to be high in a communication quality based on the eigenvalue, but for example, the selector 104 may compare a sum of the eigenvalues of the equivalent channels ($H_1 \times W_1$, $H_3 \times W_3$, and $H_4 \times W_4$) of subcarriers of the entire system band with a sum of the eigenvalues of the equivalent channels ($H_3 \times W_3$ and $H_4 \times W_4$) of subcarriers of the entire system band ad selects a candidate having a larger sum value.

Further, when the orthogonalization weight is calculated, the selector 104 may reduce the calculation amount using a processing procedure (part 2) or a processing procedure (part 3), which are described later.

The processing procedure (part 1) has been described above. According to the processing procedure (part 1), a combination of mobile station UE with a low channel correlation is selected as a combination of mobile stations UE that perform MU-MIMO communication, and thus a high communication quality can be secured.

(Processing Procedure (part 2))

As described above, when a combination of mobile stations capable of achieving high communication quality is to be selected while causing radio signals to be orthogonal between the mobile stations UE, the base station 1 can select a combination of mobile stations capable of achieving high communication quality by calculating the orthogonalization weight (W) by which each transmission antenna of the base station 1 is multiplied using the channel matrix (H) between the base station 1 and each mobile station UE and performing a predetermined calculation based on the equivalent channel (H×W) obtained by multiplying the channel matrix (H) by the orthogonalization weight (W). In this case, in order to take account of a variation in the channel matrix (H) which is caused because frequencies are different, it is desirable to perform a calculation of the orthogonalization weight (W) and the equivalent channel (H×W) in the entire band.

On the other hand, massive MIMO is assumed to be used in an environment in which a relation between the base station 1 and the mobile station DE is expected unlike LTE of the related art. In the environment in which a relation between the base station 1 and the mobile station UE is expected, generally the frequency selective fading is relatively moderate, and thus a channel variation is considered to be small in the entire band.

Therefore, in the processing procedure (part 2), the selector 104 divides the entire system band into a plurality of subbands, and calculates the orthogonalization weight (W) using a channel matrix in one of a plurality of subbands, and thus the calculation amount is reduced. In other words, the selector 104 performs the orthogonalization weight (W) calculation not for the entire band but only for a specific subband.

[Processing Procedure (Part 2-1)]

In a processing procedure (part 2-1), the selector 104 calculate the orthogonalization weight using a channel matrix in any one subband for each combination candidate of a plurality of mobile stations that perform MU-MIMO communication among a plurality of mobile stations UE1 to $UEN_U$.

Figure 8:
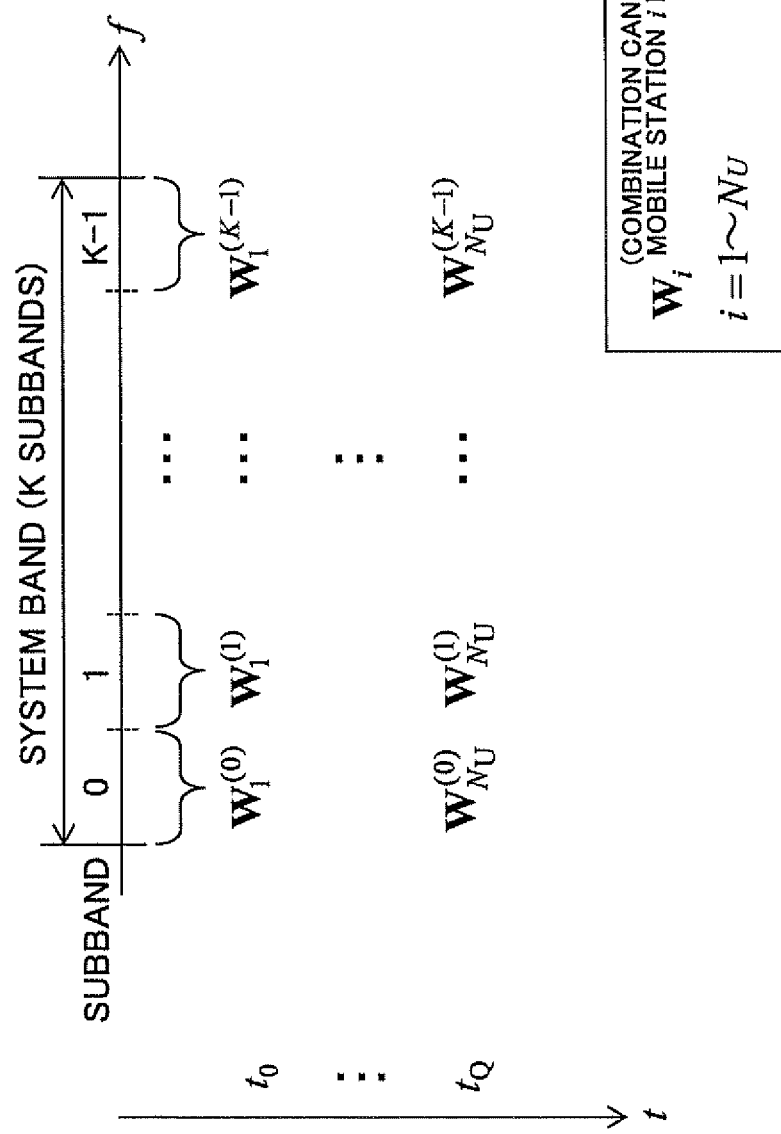
FIG. 8 is a diagram for describing an example of a procedure of calculating an orthogonalization weight for each sub-band.

More specifically, as illustrated in FIG. 8, the selector 104 divides the system band into as many subbands as the number (K) of combination candidates in which a specific mobile station UE(i) is included, and calculates the orthogonalization weight (W) using the channel matrix in any one subband for each combination candidate in which the specific mobile station UE(i) is included. Further, the selector 104 does not calculate the orthogonalization weights (W) of all the mobile station UE at a certain time but calculates the orthogonalization weights (W) at different times for the respective mobile stations UE(i).

Figure 10:
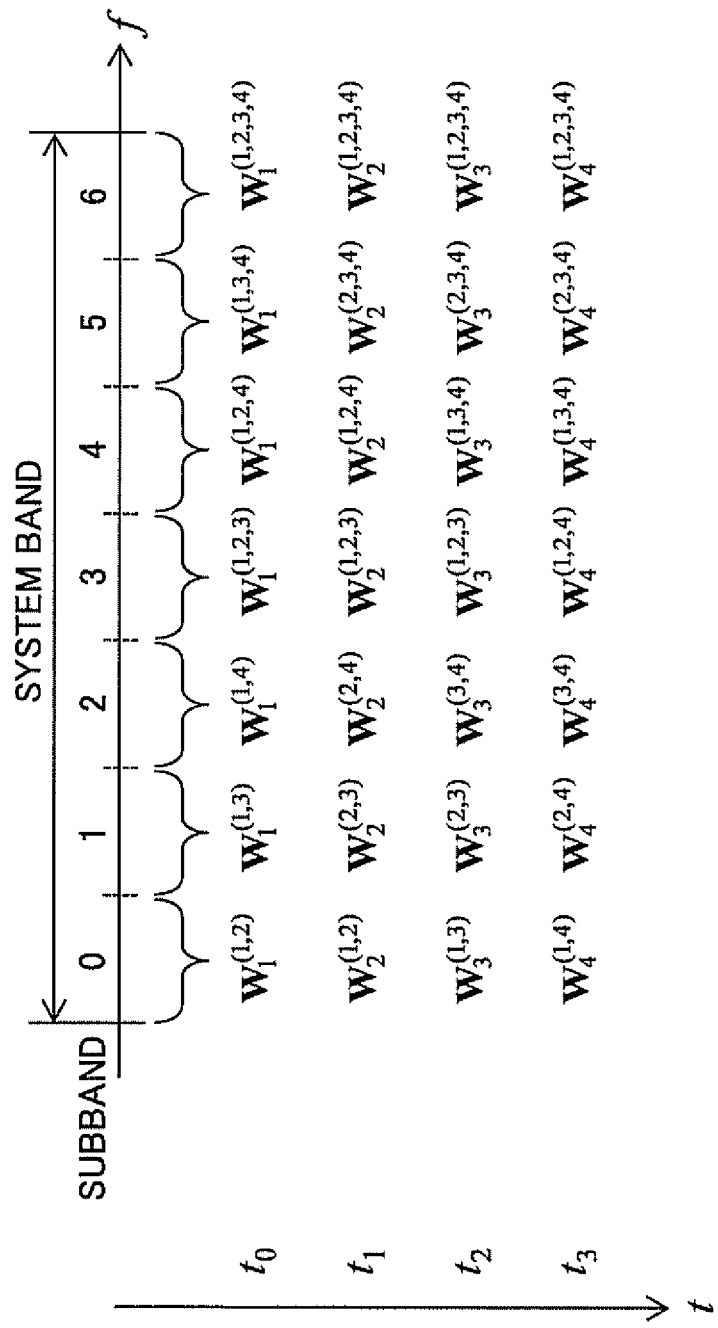
FIG. 10 is a diagram for describing a specific example of a procedure of calculating a weight candidate for each sub-band.

A specific example is described below with reference to FIGS. 9 and 10. For example, when $N_U=4$, the number of all combination candidates of four mobile stations UE is K=11 as illustrated in FIG. 9. Further, among the 11 combination candidates, there are seven combination candidates in which the mobile station UE1 is included, that is, (UE1, UE2), (UE1, UE3), (UE1, UE4), (UE1, UE2, UE3), (UE1, UE 2, UE4), (UE1, UE3, UE4), and (UE1, UE 2, UE3, UE4). Similarly, there are also seven combination candidates in which each of the mobile station UE2 to UE4 is included. Therefore, the selector 104 divides the system band into seven (K=7) subbands.

Then, at a time $t_0$, the selector 104 calculate orthogonalization weights ($W_1$) for respective combination candidates using channel matrices in subbands 0, 1, 2, 3, 4, 5, and 6 for (UE1, UE2), (UE1, UE3), (UE1, UE4), (UE1, UE2, UE3), (UE1, UE2, UE4), (UE1, UE3, UE4), and (UE1, UE2, UE3, UE4) which are combination candidates in which the mobile station UE1 is included. More specifically, the orthogonalization weight ($W_1$) of the mobile station UE1 is calculated for each combination candidate by performing a process of calculating the orthogonalization weight ($W_1$) of the mobile station UE1 when the mobile station UE1 and the mobile station UE2 are combined using the channel matrices ($H_1$ and $H_2$) in the subband 0, calculating the orthogonalization weight ($W_1$) of the mobile station UE1 when the mobile station UE1 and the mobile station UE3 are combined using the channel matrices ($H_1$ and $H_3$) in the subband 1, and calculating the orthogonalization weight ($W_1$) of the mobile station UE1 when the mobile station UE1 and the mobile station UE4 are combined using the channel matrices ($H_1$ and $H_4$) in the subband 2 for all the combination candidates.

Then, at a time t1, the selector 104 calculate orthogonalization weights ($W_2$) of the mobile station UE2 for respective combination candidates using channel matrices in subbands 0, 2, 3, 4, 5, and 6 for (UE1, UE2), (UE2, UE3), (UE2, UE4), (UE1, UE2, UE3), (UE1, UE2, UE4), (UE2, UE3, UE4), and (UE1, UE2, UE3, UE4) which are combination candidates in which the mobile station UE2 is included. Similarly, an orthogonalization weight ($W_3$) of the mobile station UE3 is calculated at a time t2, and the orthogonalization weight ($W_4$) of the mobile station UE4 is calculated at a time t3.

After the calculation of the orthogonalization weight is completed through the above procedure, for example, the selector 104 calculates the equivalent channel (H×W) of each mobile station UE for each combination candidate, and selects a combination of mobile stations UE that are determined to be high in a communication quality (a combination of mobile stations UE that perform MU-MIMO communication) based on all the equivalent channels of the respective combination candidates. Any method can be used as a method for selecting a candidate determined to be high in a communication quality, but for example, the selector 104 may compare the sum values of the eigenvalues of the equivalent channels of the subcarriers in the subbands and select a combination candidate having a large sum value as a combination of mobile stations UE.

Figure 11:
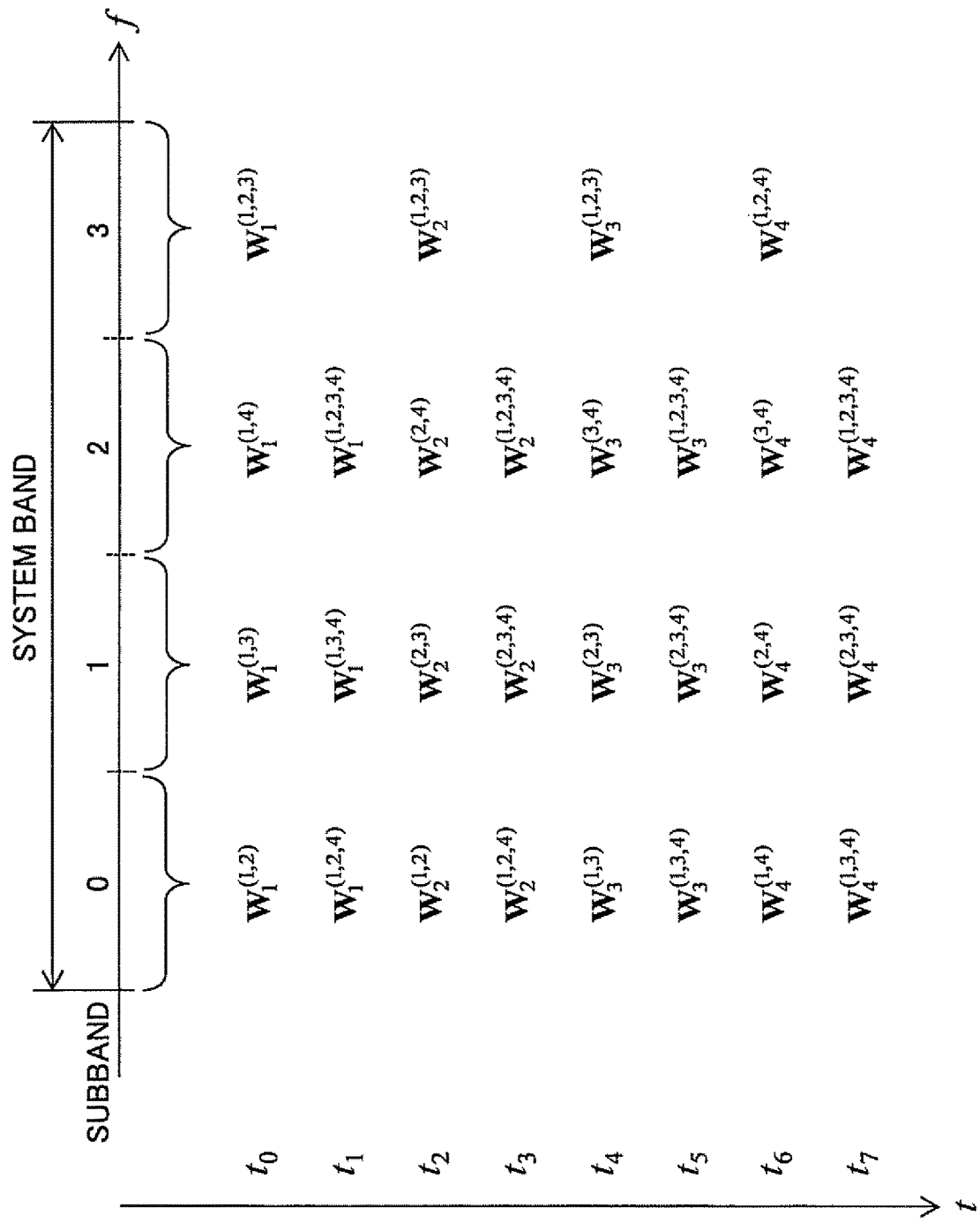
FIG. 11 is a diagram for describing a specific example of a procedure of calculating a weight candidate for each sub-band (a first modified example)
Figure 12:
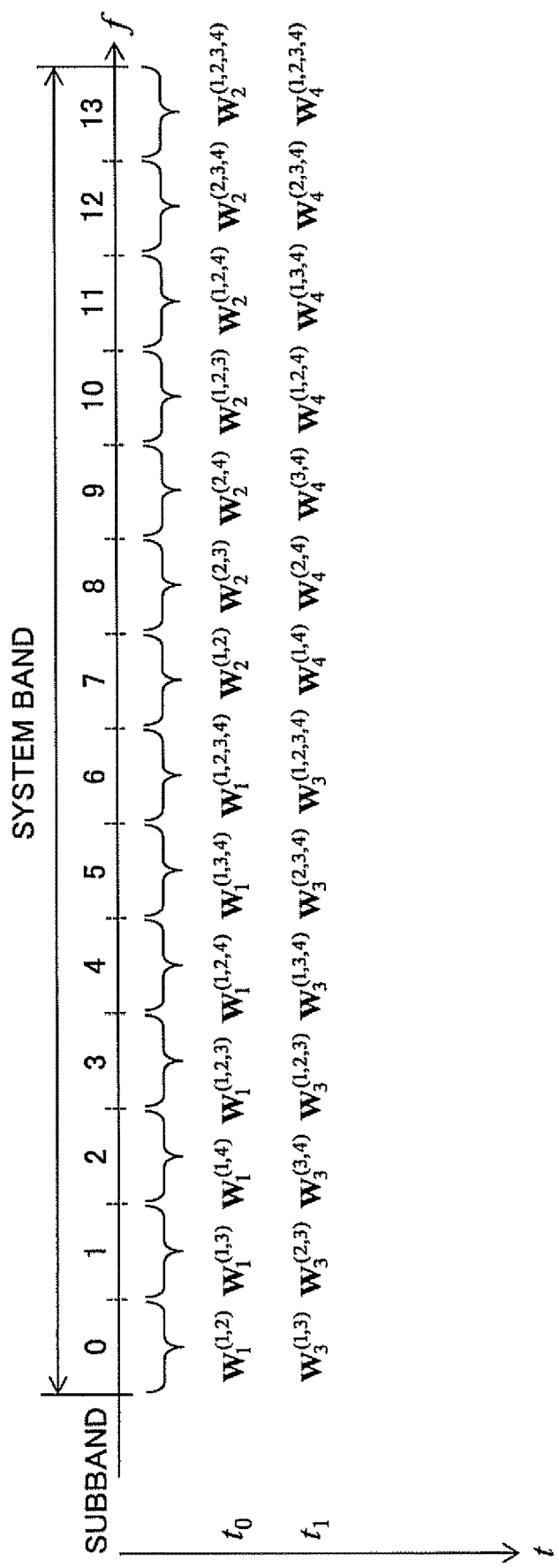
FIG. 12 is a diagram for describing a specific example of a procedure of calculating a weight candidate for each subband (a second modified example)

The specific example has been described above with reference to FIGS. 9 and 10. Instead of calculating all the orthogonalization weights ($W_i$) in a specific mobile station UE(i) at a certain time, the selector 104 may perform the calculation across a plurality of times. For example, as illustrated in FIG. 11, the selector 104 may calculate the orthogonalization weight ($W_1$) of the mobile station UE1 at the times $t_0$ and $t_1$, calculate the orthogonalization weight ($W_2$) of the mobile station UE2 at the times $t_2$ and $t_3$, and calculates the orthogonalization Weight ($W_3$) of the mobile station UE3 at the times $t_4$ and $t_5$, and calculate the orthogonalization weight ($W_4$) of the mobile station UE4 at the times $t_6$ and $t_7$. In this case, the number of divided subbands may be a number obtained by performing the division by a plurality of times used for a calculation of the orthogonalization weight (K/2 in the example of FIG. 11). Thus, since a range of the subbands of the channel matrix used for the calculation of the orthogonalization weight (W) is increased, it is possible to determine the communication quality more appropriately.

Further, the selector 104 may calculate the orthogonalization weights of a plurality of mobile stations UE at a certain time. For example, as illustrated in FIG. 11, the selector 104 may calculate the orthogonalization weights ($W_1$ and $W_2$) of the mobile stations UE1 and UE2 at the time $t_0$ and calculate the orthogonalization weights ($W_3$ and $W_4$) of the mobile stations UE3 and UE4 at the time $t_1$. Thus, it is possible to calculate the orthogonalization weights (W) in a shorter time.

[Processing Procedure (Part 2-2)]

In a processing procedure (part 2-2), the selector 104 limits combination candidates of mobile stations UE for each subband in advance, and calculates the orthogonalization weight for the limited combination candidates of mobile stations UE. More specifically, the selector 104 allocates each of a plurality of mobile stations UE1 to $UEN_U$ to an arbitrary subband, and calculates the orthogonalization weight using the channel matrix in the allocated subband for all combination candidates in a plurality of mobile stations UE allocated for each subband.

Figure 13:
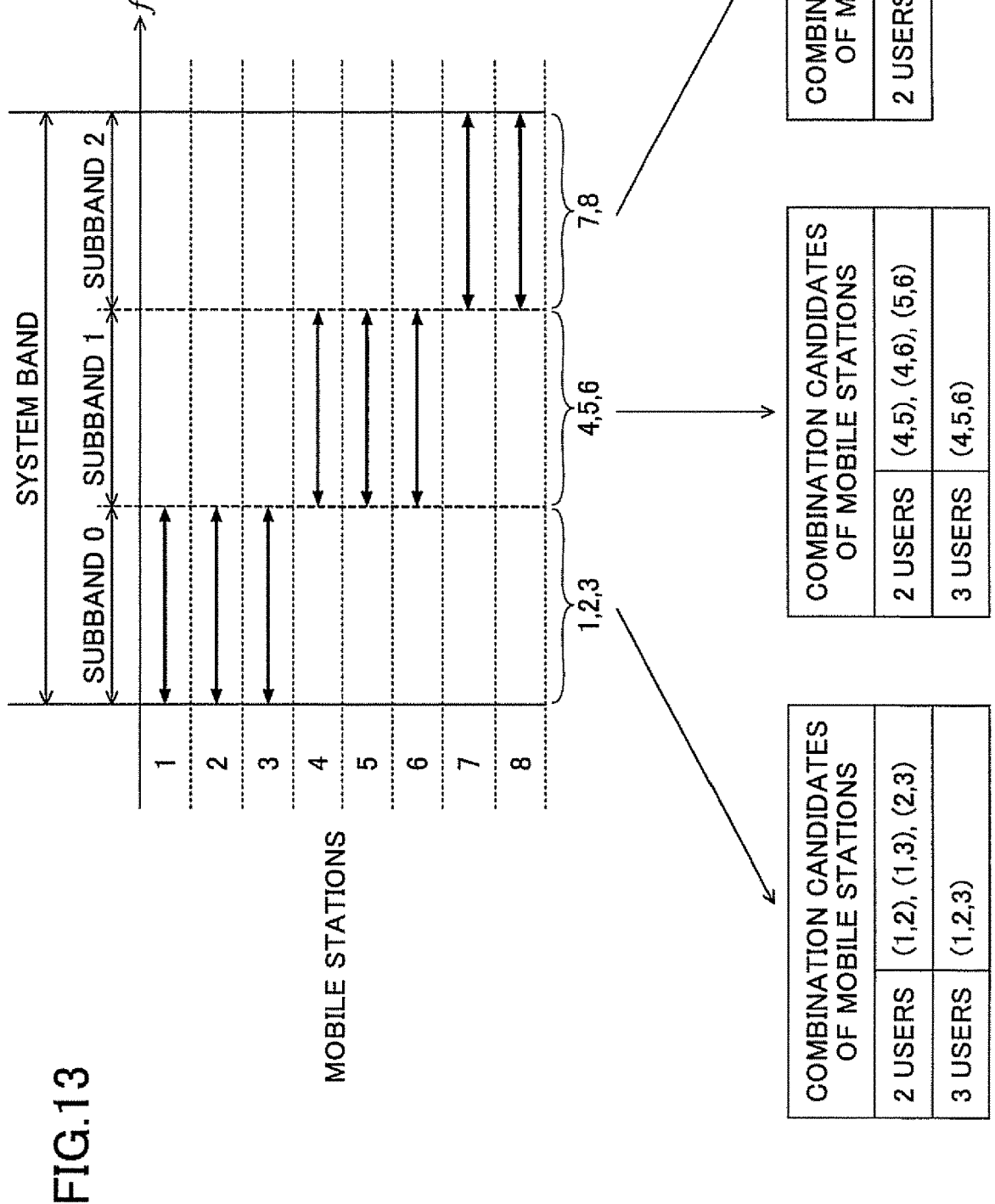
FIG. 13 is a diagram for describing a procedure of limiting candidates of the combination of mobile stations for each sub-band.

A specific example of the processing procedure (part 2-2) is described with reference to FIG. 13. In FIG. 13, $N_U=8$ is assumed. First, the selector 104 divides the system band into an arbitrary number of subbands (three in the example of FIG. 13) and allocates each of the mobile stations UE1 to UE8 to an arbitrary subband. In the example of FIG. 13, the selector 104 allocates the mobile stations UE1 to UE3 to the subband 0, allocates the mobile stations UE4 to UE6 to the subband 1, and allocates the mobile station UE7 and UE8 to the subband 2.

Then, the selector 104 calculates the orthogonalization weights (W$_1$, W$_2$, and W$_3$) for the respective combination candidates of the mobile stations UE1 to UE3 in the subband 0. More specifically, the selector 104 calculates the orthogonalization weights (W$_1$ and W$_2$) using the channel matrices (H$_1$ and H$_2$) in the subband 0 when the mobile stations UE1 and the UE2 are combined, calculates the orthogonalization weights (W$_1$ and W$_3$) using the channel matrices (H$_1$ and H$_3$) in the subband 0 when the mobile stations UE1 and the UE3 are combined, calculates the orthogonalization weights (W$_2$ and W$_3$) using the channel matrices (H$_2$ and H$_3$) in the subband 0 when the mobile stations UE2 and the UE3 are combined, and calculates the orthogonalization weights (W$_1$, W$_2$, and W$_3$) using the channel matrices (H$_1$, H$_2$, and H$_3$) in the subband 0 when the mobile stations UE1, UE2, and the UE3 are combined. Similarly, the selector 104 calculates the orthogonalization weights (W$_4$, W$_5$, and W$_6$) for the combination candidates of the mobile stations UE4 to UE 6 in the subband 1, and calculates the orthogonalization weights (W$_7$ and W$_8$) for the combination candidates of the mobile stations UE7 and the UE8 in the subband 2.

In the processing procedure (part 2-2), after the calculation of the orthogonalization weight is completed, the selector 104 may select a combination of mobile stations UE determined to be high in the communication quality (a combination of mobile stations UE that perform MU-MIMO communication) from combination candidates of mobile stations UE allocated to each subband. In other words, in the example of FIG. 13, the selector 104 may select any one combination of mobile stations UE among all combination candidates of mobile stations UE illustrated in FIG. 13.

Further, the selector 104 may select one combination candidate of mobile stations UE determined to be high in the communication quality for each subband and include all the mobile station UEs included in the selected combination candidate of mobile stations UE in a combination of mobile stations UE that perform MU-MIMO communication. For example, in the example of FIG. 13, the selector 13 may select the combination of mobile stations UE1 and UE2 from the subband 0, select the combination of mobile stations UE4 and UE6 from the subband 1, select the combination of mobile stations UE7 and UE8 from the subband 1, and include the mobile stations UE1, UE2, UE4, UE6, UE7, and UE8 in the combination of mobile stations UE that perform MU-MIMO communication.

The processing procedure (part 2) has been described above. The division into the subbands in the processing procedure (part 2-1) and the allocation of the mobile stations UE to each subband in the processing procedure (part 2-2) are merely performed to select the combination of mobile stations UE that perform MU-MIMO communication. Therefore, when MU-MIMO communication is actually performed, the base station 1 may re-calculate the orthogonalization weight (W) for the selected combination of mobile stations UE in the entire system band again.

(Processing Procedure (part 3))

As described in the processing procedure (part 2), when a combination of mobile stations capable of achieving high communication quality is to be selected while causing radio signals to be orthogonal between the mobile stations UE, the base station 1 can select a combination of mobile stations capable of achieving high communication quality by calculating the orthogonalization weight (W) by which each transmission antenna of the base station 1 is multiplied using the channel matrix (H) between the base station 1 and each mobile station UE and performing a predetermined calculation based on the equivalent channel (H×W) obtained by multiplying the channel matrix (H) by the orthogonalization weight (W). However, since the massive MIMO base station includes a plurality of antenna elements, the size of the channel matrix (H) is large, the calculation amount necessary for calculating the orthogonalization weight (W) and the equivalent channel (H×W) increases.

However, in massive MIMO, since a distance between antenna elements is relatively close, a channel variation between antennas is considered to be relatively small. In this regard, in a processing procedure (part 3), the selector 104 reduces the calculation amount by calculating the orthogonalization weight (W) using a submatrix obtained by cutting out a part of the channel matrix (H).

A position and a size of a submatrix illustrated in Formula (3) is an example and can be arbitrarily changed. Formula (3) illustrates only an example of a sub-matrix of the mobile station UE(j), but when the orthogonalization weight (W) is calculated, the selector 104 performs the calculation in a state in which all the submatrices of the mobile stations UE are set to the same position and size. For example, when the orthogonalization weights (W$_1$ and W$_2$) are calculated in the combination of the mobile station UE1 and the mobile station UE2, the selector 104 sets the position and size of the submatrix of the mobile station UE1 to be identical to the position and size of the submatrix of the mobile station UE2 and then performs the calculation.

[Math. 3]

$$H_i = \begin{bmatrix} h_j(0,0) & \cdots & h_j(0, n_{tj}) & \cdots & h_j(0, N_T-1) \\ \vdots & \ddots & \vdots & \ddots & \vdots \\ h_j(n_{rj}, 0) & \cdots & h_j(n_{rj}, n_{tj}) & \cdots & h_j(n_{rj}, N_T-1) \\ \vdots & \ddots & \vdots & \ddots & \vdots \\ h_j(n_{Rj}-1, 0) & \cdots & h_j(N_{Rj}-1, n_{tj}) & \cdots & h_j(N_{Rj}-1, N_T-1) \end{bmatrix} \quad \text{formula (3)}$$

In formula (3), the submatrix may be an $(n_{rj}+1)$-by-$(n_{tj}+1)$ matrix formed by elements in rows 0 to $n_{rj}$ and lines 0 to $n_{tj}$. The processing procedure (part 3) has been described above. The calculation of the orthogonalization weight (W) using the submatrix is merely performed to select the combination of mobile stations UE that perform MU-MIMO communication. Therefore, when MU-MIMO communication is actually performed, the base station 1 may calculate the orthogonalization weight (W) again using the original channel matrix (H) for the selected combination of mobile stations UE.

The processing procedure (part 3) is also applicable to processing procedure (part 1) or processing procedure (part 2). In other words, the selector 104 calculates the orthogonalization weight using the sub-matrix when the orthogonalization weight is calculated in the processing procedure (part 1) (particularly, when [Selection method 3] in the processing procedure (part 1) is performed). Further, when the orthogonalization weight is calculated in the processing procedure (part 2), the selector 104 may calculate the orthogonalization weight using the submatrix.

CONCLUSION

As described above, according to the embodiment, there is provided a base station for communicating with a plurality of mobile stations of a radio communication system including the base station and the plurality of mobile stations, the base station including an obtaining unit that obtains a channel matrix for each of the plurality of mobile stations; a selector that selects, among the plurality of mobile stations, a combination of two or more mobile stations with which communication based on multi-user MIMO is to be performed; and a communication unit that performs the communication based on multi-user MIMO with the two or more mobile stations of the selected combination, wherein the selector calculates, for each of all combinations of two mobile stations of the two or more mobile stations, a correlation value between the channel matrices for the two mobile stations, and selects the combination of the two or more mobile stations, so that, for all the combinations of the two mobile stations, the correlation values is less than or equal to a predetermined value. According to the base station 1, a technique is provided that allows a combination of mobile stations, with which MU-MIMO is to be performed, to be quickly selected in a radio communication system using MU-MIMO.

Note that, during calculation of the correlation value of the channel matrices of the two mobile stations of the two or more mobile stations, the selector may calculate the correlation value using a column vector of a part of antennas of the base station among column vectors generated from the channel matrices. As a result, a calculation amount during the calculation of the correlation value can be reduced, and selection of the combination of the mobile stations UEs can be quickly performed.

As described above, according to the embodiment, there is provided a base station for communicating with a plurality of mobile stations of a radio communication system including the base station and the plurality of mobile stations, the base station including an obtaining unit that obtains a channel matrix for each of the plurality of mobile stations; a selector that selects, among the plurality of mobile stations, a combination of two or more mobile stations with which communication based on multi-user MIMO is to be performed; and a communication unit that performs the communication based on multi-user MIMO with the two or more mobile stations of the selected combination, wherein the selector divides an entire system band into a plurality of subbands, and the selector calculates an orthogonalization weight and an equivalent channel using a channel matrix in a subband of the plurality of subbands so as to select the combination of the two or more mobile stations. According to the base station 1, a technique is provided that allows a combination of mobile stations, with which MU-MIMO is to be performed, to be quickly selected in a radio communication system using MU-MIMO.

Further, the selector may calculate the orthogonalization weight and the equivalent channel using a channel matrix in a subband for each candidate of the combination of the two or more mobile stations that perform multi-user MIMO communication, among the plurality of mobile stations. As a result, a calculation amount for calculating the orthogonalization weight and the equivalent channel can be reduced.

Further, the selector may select the combination of the two or more mobile stations by grouping the plurality of mobile stations into a plurality of groups corresponding to a number of the plurality of subbands, associating each group of the plurality of groups with a subband of the plurality of subbands, and calculating the orthogonalization weight and the equivalent channel using the channel matrix in the subband allocated to a candidate of a combination of mobile stations of the plurality of mobile stations included in the group associated with each subband of the plurality of subbands. As a result, a calculation amount for calculating the orthogonalization weight and the equivalent channel can be reduced.

Furthermore, according to the embodiment, there is provided a base station for communicating with a plurality of mobile stations of a radio communication system including the base station and the plurality of mobile stations, the base station including an obtaining unit that obtains a channel matrix for each of the plurality of mobile stations; a selector that selects, among the plurality of mobile stations, a combination of two or more mobile stations with which communication based on multi-user MIMO is to be performed; and a communication unit that performs the communication based on multi-user MIMO with the two or more mobile stations of the selected combination, wherein the selector calculates an orthogonalization weight and an equivalent channel using a submatrix obtained by cutting out a part of the channel matrix so as to select the combination of the two or more mobile stations with which the communication based on multi-user MIMO is to be performed. According to the base station 1, a technique is provided that allows a combination of mobile stations, with which MU-MIMO is to be performed, to be quickly selected in a radio communication system using MU-MIMO.

Additional Embodiments

In the above-described embodiment, the "processing procedure (part 1)" to the "processing procedure (part 3)" may be arbitrarily combined.

The configurations of the devices (the base station 1 and the mobile station UE) described above in the embodiment of the present invention may be implemented such that a program is executed by a CPU (processor) in a device having the CPU and a memory, may be a configuration implemented by hardware such as a hardware circuit equipped with a processing logic described in the present embodiment, or may be a combination of a program and hardware.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Furthermore, each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The exemplary embodiment of the present invention is described above, but the disclosed invention is not limited to the above embodiment, and those skilled in the art would understand that various modified examples, revised examples, alternative examples, substitution examples, and the like can be made. In order to facilitate understanding of the invention, specific numerical value examples are used for description, but the numerical values are merely examples, and certain suitable values may be used unless otherwise stated. The classification of items in the above description is not essential to the present invention, matter described in two or more items may be combined and used as necessary, and matter described in one item may be applied to matter described in another item (provided that there is no contradiction). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the sequences and the flowcharts described in the embodiment, the order may be changed as long as there is no inconsistency. For the sake of convenience of description, the base station 1 and mobile station UE have been described using the functional block diagrams, but such devices may be implemented by hardware, software, or a combination thereof. Software executed by the processor included in the base station 1 according to the embodiment of the present invention and software executed by the processor included in the mobile station UE according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

This international patent application is based upon and claims the benefit of priority of Japanese Patent Application No. 2016-048755 filed on Mar. 11, 2016, and the entire contents of Japanese Patent Application No. 2016-048755 are incorporated herein by reference.

EXPLANATIONS OF LETTERS OR NUMERALS 1 base station
UE mobile station
101 signal transmitter
102 signal receiver
103 obtaining unit
104 selector 201 RF module
202 BB processing module
203 device control module
204 communication IF

The invention claimed is:

1. A base station for communicating with a plurality of mobile stations of a radio communication system including the base station and the plurality of mobile stations, the base station comprising:
an obtaining unit that obtains a channel matrix for each of the plurality of mobile stations;
a selector that selects, among the plurality of mobile stations, a combination of two or more mobile stations with which communication based on multi-user Multiple Input Multiple Output (MIMO) is to be performed; and
a communication unit that performs the communication based on multi-user MIMO with the two or more mobile stations of the selected combination,
wherein the selector calculates, for each of all combinations of two mobile stations of the two or more mobile stations, a mobile station i and a mobile station j, i≠j, a correlation value, $$c_{i,j} = \sum_{n_t \in \mu} \|h_{i,n_t}^H h_{j,n_t}\|^2 / (a_{i,n_t} \cdot a_{j,n_t}),$$

between the channel matrices for the two mobile stations, $$H_i = \begin{bmatrix} h_i(1,1) & \cdots & h_i(1, N_T) \\ \vdots & \ddots & \vdots \\ h_i(N_{Ri}, 1) & \cdots & h_i(N_{Ri}, N_T) \end{bmatrix} \text{ and}$$

$$H_j = \begin{bmatrix} h_j(1,1) & \cdots & h_j(1, N_T) \\ \vdots & \ddots & \vdots \\ h_j(N_{Rj}, 1) & \cdots & h_j(N_{Rj}, N_T) \end{bmatrix}$$

where $N_{Ri}$ is a number of antennas of the mobile station i, $N_{Rj}$ is a number of antennas of the mobile station j, $N_T$ is a number of antennas of the base station, $n_t$ is the antennas selected for correlation calculation, $\mu$ is the number of antennas selected for the correlation calculation, and $a_{i,int}$ and $a_{j,int}$ are normalization coefficients, and selects the combination of the two or more mobile stations, so that, for all the combinations of the two mobile stations, the correlation values is less than or equal to a predetermined value.

2. The base station according to claim 1,
wherein, during calculation of the correlation value of the channel matrices of the two mobile stations of the two or more mobile stations, the selector calculates the correlation value using a column vector of a part of antennas of the base station among column vectors generated from the channel matrices.

3. A base station for communicating with a plurality of mobile stations of a radio communication system including the base station and the plurality of mobile stations, the base station comprising:
an obtaining unit that obtains a channel matrix for each of the plurality of mobile stations;
a selector that selects, among the plurality of mobile stations, a combination of two or more mobile stations with which communication based on multi-user Multiple Input Multiple Output (MIMO) is to be performed; and
a communication unit that performs the communication based on multi-user MIMO with the two or more mobile stations of the selected combination,
wherein a channel matrix for a mobile station i of the plurality of mobile stations is $$H_i = \begin{bmatrix} h_i(1,1) & \cdots & h_i(1, N_T) \\ \vdots & \ddots & \vdots \\ h_i(N_{Ri}, 1) & \cdots & h_i(N_{Ri}, N_T) \end{bmatrix}$$

where $N_{Ri}$ is a number of antennas of the mobile station i, and $N_T$ is a number of antennas of the base station, and
wherein the selector divides an entire system band into a plurality of subbands, and the selector calculates an orthogonalization weight and an equivalent channel using a channel matrix in a subband of the plurality of subbands so as to select the combination of the two or more mobile stations.

4. The base station according to claim 3,
wherein the selector calculates the orthogonalization weight and the equivalent channel using a nonscalar channel matrix in a subband for each candidate of the combination of the two or more mobile stations that perform multi-user MIMO communication, among the plurality of mobile stations.

5. The base station according to claim 3,
wherein the selector selects the combination of the two or more mobile stations by grouping the plurality of mobile stations into a plurality of groups corresponding to a number of the plurality of subbands, associating each group of the plurality of groups with a subband of the plurality of subbands, and calculating the orthogonalization weight and the equivalent channel using the channel matrix in the subband allocated to a candidate of a combination of mobile stations of the plurality of mobile stations included in the group associated with each subband of the plurality of subbands.

6. A base station for communicating with a plurality of mobile stations of a radio communication system including the base station and the plurality of mobile stations, the base station comprising:
an obtaining unit that obtains a channel matrix for each of the plurality of mobile stations;
a selector that selects, among the plurality of mobile stations, a combination of two or more mobile stations with which communication based on multi-user Multiple Input Multiple Output (MIMO) is to be performed; and
a communication unit that performs the communication based on multi-user MIMO with the two or more mobile stations of the selected combination,
wherein a channel matrix for a mobile station i of the plurality of mobile stations is $$H_i = \begin{bmatrix} h_i(1,1) & \cdots & h_i(1, N_T) \\ \vdots & \ddots & \vdots \\ h_i(N_{Ri}, 1) & \cdots & h_i(N_{Ri}, N_T) \end{bmatrix}$$

where $N_{Ri}$ is a number of antennas of the mobile station i, and $N_T$ is a number of antennas of the base station, wherein the selector calculates an orthogonalization weight and an equivalent channel using a submatrix obtained by cutting out a part of the channel matrix so as to select the combination of the two or more mobile stations with which the communication based on multi-user MIMO is to be performed.

* * * * *